United States Patent Office 3,277,195
Patented Oct. 4, 1966

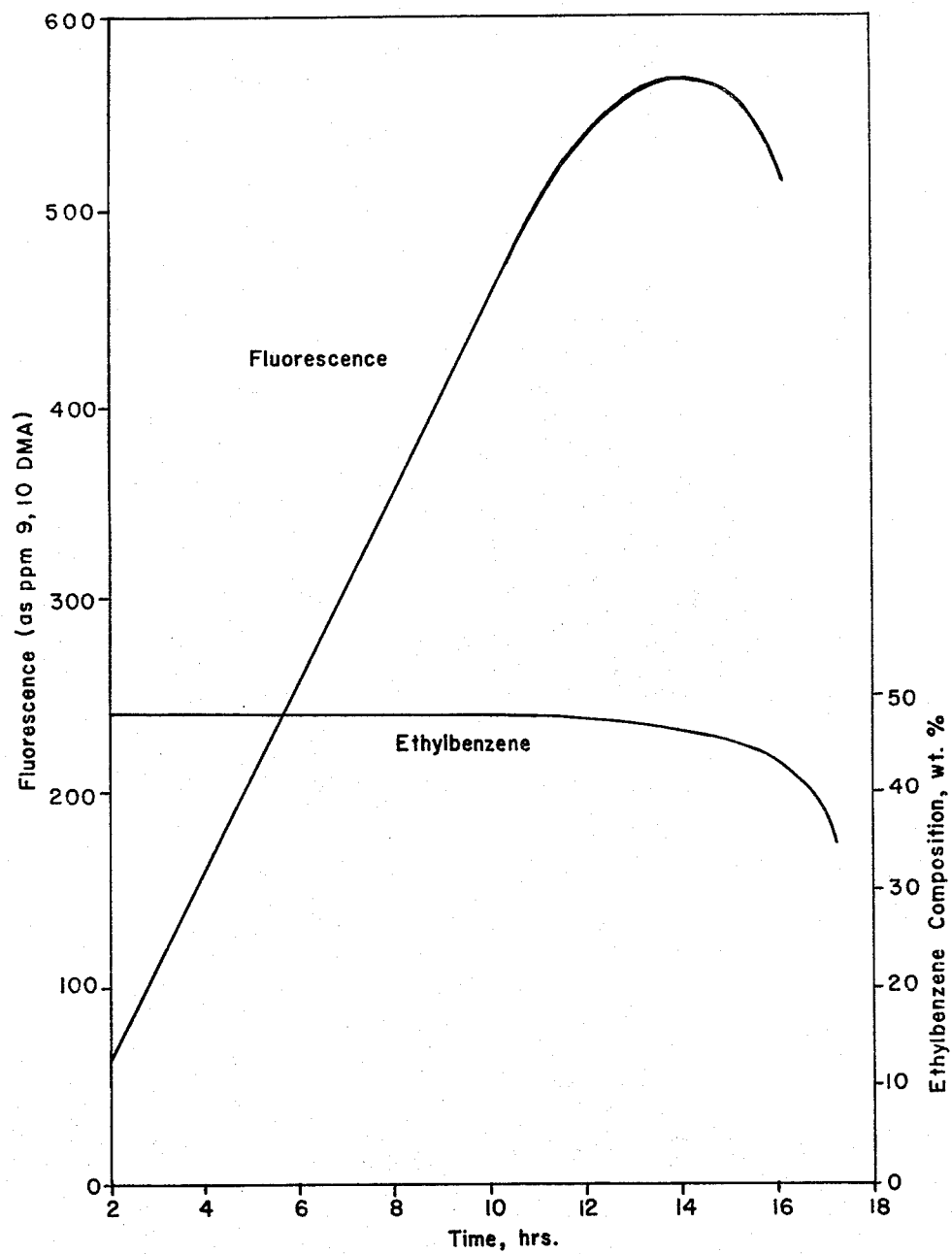

3,277,195
CONTROL OF ALKYLATION CATALYST
ACTIVITY
Robert J. Bodre, La Marque, Tex., assignor to Monsanto
Company, a corporation of Delaware
Filed May 23, 1963, Ser. No. 282,638
5 Claims. (Cl. 260—671)

The present invention is concerned with an improved process for alkylating an aromatic hydrocarbon in the presence of a Friedel-Crafts type catalyst. More particularly, this invention relates to a method for continuously determining the catalyst activity during the alkylation of an aromatic hydrocarbon with an olefin.

The reaction of alkylating agents such as olefins and alkyl halides with aromatic compounds in the presence of a metal halide is well known and widely used in industry. It is well understood that in this reaction the active catalyst is not the solid metal halide itself, but an organometal halide complex comprising the metal halide and aromatic compounds and probably also comprising some of the alkylated aromatic compound and an acid. This substance, which is commonly termed "catalyst complex," resembles a heavy oil in consistency, is usually brown to black in color, and has a somewhat variable composition depending upon the reactants in the system.

In the usual continuous operation, the aromatic hydrocarbon and the olefin are reacted in the presence of an aluminum chloride catalyst complex to produce an alkylated liquor. The catalyst complex is prepared separately and circulated continuously to the alkylator reactor. Usually, so-called promoters such as ethyl chloride and hydrochloric acid are required and are added in small amounts to either the benzene or ethylene in the case of the production of ethylbenzene or even added to the reaction liquor itself for the purpose of accelerating the reaction. Catalyst complex is readily separated from the alkylated liquor because of the difference in specific gravities, by flowing the reaction mixture into a separator provided with separate draw-off lines for the lighter alkylated liquor and the heavier catalyst complex. The catalyst complex is then returned to the reactor for reuse.

Over a period of time, the catalyst complex gradually loses its activity and it is common practice in the art to reinforce it with fresh aluminum chloride and promoters to revive its catalytic properties. While the existence of the problem of periodically determining and controlling the catalyst activity has been generally recognized, there has not been found a simple and accurate means for determining catalyst activity in order to maintain it at the high level required in the process for maximum efficiency and to prevent the catalyst complex from "losing its activity" which necessitates recharging the reactor with catalyst. Many methods have been suggested but most of these are either long and tedious analytical procedures or are not reliable enough in the critical range needed. The known methods also provide only limited control since there is a significant time lag between the withdrawal of samples and the ultimate determination of activity based on laboratory testing.

It has been discovered in accordance with the present invention that Friedel-Crafts catalyst complexes produce polynuclear compounds over a period of use in the alkylation of an aromatic hydrocarbon with an olefin and these polynuclear compounds are fluorescent under excitation by ultraviolet light.

It is an object, therefore, of this invention to provide a simple, sensitive and inexpensive method of determining the alkylation catalyst activity when alkylating an aromatic hydrocarbon with an olefin in the presence of a metal halide catalyst complex. Another object of the invention is to obtain a continuous and accurate control means for maintaining the activity of the catalyst complex in an alkylation process. Still another object of the invention is to determine conditions in an alkylation process so as to produce a constantly high yield of alkylated product. Further objects and advantages of the invention will be apparent from the following description.

According to the present invention, the catalyst activity of a Friedel-Crafts type alkylation catalyst used in the alkylation of an aromatic hydrocarbon is determined by measuring the amount of fluorescence from polynuclear compounds produced during the alkylation reaction.

While the process is described with reference to the preferred embodiment of the production of ethylbenzene from the reaction of ethylene and benzene in the presence of an aluminum chloride catalyst complex, it will be understood that the method is generally applicable to all Friedel-Crafts type alkylations of aromatic compounds. The following examples are, therefore, given to illustrate the invention and are not to be construed as limiting it in any manner whatsoever.

EXAMPLE I

Benzene was alkylated with ethylene in an atmospheric laboratory reactor in the presence of newly prepared aluminum chloride catalyst complex. The alkylation was carried out at a temperature of approximately 85° C. Samples of alkylate were hourly analyzed for ethylbenzene by gas chromatograph and for fluorescence.

The fluorescence of the alkylate was determined on an analytical instrument consisting of a Beckman Model DU spectrophotometer equipped with Beckman No. 73,500 fluorescence attachment and UG–11 filter. This equipment was calibrated at a wave length of 430 m$\mu$ by determining the fluorescence of standard solutions of 9,10-dimethylanthracene which had previously been isolated in pure form from aluminum chloride catalyst complex. Cyclohexane which showed no fluorescence in the 380–600 m$\mu$ range was used as a solvent. The fluorescence spectrum of 9,10-dimethylanthracene revealed maxima of 407, 428, 455 and 480 m$\mu$. It was found from samples of a recent run that 10 or 20% solution of washed alkylate in cyclohexane showed a fluorescence spectrum very similar to that of 9,10-dimethylanthracene with broad maxima at 410, 433 and 455 m$\mu$.

To determine if a correlation exists between fluorescence and the activity of the catalyst, the fluorescence of the alkylate at 430 m$\mu$ as compared with pure 9,10-dimethylanthracene was plotted on the same figure as the weight percent ethylbenzene in the alkylate, both of these curves being plotted against time. The results of this plot are shown in the attached drawing.

Table I also compares the weight percent of ethylbenzene in the alkylate with the fluorescence of the alkylate measured as parts per million of 9,10-dimethylanthracene over a period of time beginning with the initial contact of the reactants with the catalyst.

Table 1
ANALYSES OF ALKYLATE

| Time, Hrs. | Fluorescence, p.p.m. | Ethylbenzene, wt. Percent |
|---|---|---|
| 1  | 24  |      |
| 2  | 47  | 48.8 |
| 3  | 115 |      |
| 4  | 181 |      |
| 5  | 210 | 47.0 |
| 6  | 242 |      |
| 7  | 280 | 48.0 |
| 8  | 361 |      |
| 10 | 300 | 46.7 |
| 11 | 520 |      |
| 12 | 540 |      |
| 13 | 531 | 46.7 |
| 14 | 576 |      |
| 15 | 560 |      |
| 16 | 528 | 44.0 |
| 17 |     | 38.8 |

It will be apparent to those skilled in the art that the change in fluorescence of the alkylate correlates directly with changes in ethylbenzene concentration of the alkylate. It is noted that the fluorescence increases throughout the run of 17 hours until the break point is reached at about 15 hours. Thus, the formation of polynuclear compounds, which are exemplified by the increase in fluorescence, occurs extensively and progressively during the alkylation reaction.

Considerable latitude may be exercised in the choice of conditions for the alkylation reaction and remain within the scope of this invention. The alkylation reaction can be carried out in any type of suitable reactor, either in a continuous or batch-wise fashion. The apparatus and techniques employed in the process have been adequately described in the alkylation art and do not form a part of this invention. Generally, the reaction is effected by introducing the preformed catalyst complex, benzene, hydrogen chloride and the ethylene alkylating agent, in the case of the production of ethylbenzene, into the reaction zone maintained at a temperature in the range from about 60° C. to about 150° C. Reaction temperatures in the range from about 70° C. to about 90° C are preferred when the reaction is conducted under the usual atmospheric pressure. The alkylation reaction may, however, be carried out at superatmospheric pressures ranging from 80 to about 300 p.s.i.g. if desired and at these pressures, the higher temperatures prevail.

Generally, from 1 to 2.5 parts by weight of catalyst complex are employed per part of benzene, but preferably the catalyst complex-benzene ratio is kept at approximately 2:1. A suitable benzene-ethylene weight ratio lies in the range from about 4:1 to about 7:1 and preferably a ratio of about 6:1 is used.

The amount of hydrogen halide such as hydrogen chloride ordinarily employed as a promoter in the alkylation reaction may vary from a minimum of 1 part by weight per thousand parts of ethylene to 1 part for every 10 parts of ethylene. Most beneficial results are obtained when a hydrogen chloride to ethylene ratio of 1:100 is employed.

As mentioned previously, the invention has been described for the purpose of clarity with special reference to the preparation of ethylbenzene, but it may be applied to producing other alkylated aromatic compounds. For instance, the method may be employed in reacting ethylene with toluene to produce ethyltoluenes, in reacting propylene with benzene to produce isopropylbenzene or polypropylbenzene, in reacting butylene with benzene to form a butylbenzene or polybutylbenzene and the like.

The process of this invention is also applicable in dealkylation processes. It is well known that polyalkyl aromatic compounds such as polyethylbenzene may be reacted with an aromatic compound such as benzene in the presence of a Friedel-Crafts organo-metal halide catalyst complex to yield the monoalkylated compound such as ethylbenzene. The same problems of maintaining catalyst activity are presented in such dealkylation processes and the method of this invention may be utilized as successfully for determining and maintaining catalyst complex activity as it is in the alkylation process described.

The process of this invention is also applicable in combining alkylation-dealkylation processes and for methods where the polyalkylated aromatic compound is returned to the alkylation reaction where it serves to suppress the further formation of polyalkylated material and to direct the reaction to the formation of the monoalkylated product. The procedures for carrying out such reactions are well known and need not be given in detail.

The property of fluorescence is generally well known to those skilled in the art. Briefly, fluorescence means the transformation of light by matter. Fluorescence is known as a type of radiant energy emission which is produced when a substance returns to a normal state after having been raised to an excited condition by the absorption of energy. In other words, it is the property of certain substances to radiate, when illuminated, an unpolarized light of a different and usually greater wave length. So in the case described in this application, the sample of hydrocarbon containing polynuclear compounds is excited by ultraviolet light of a certain wave length and the fluorescence is then measured at a 90° angle to the incident light to determine the results from this excitation.

By polynuclear compounds is meant molecules containing two or more atomic rings. Examples of such compounds found in the alkylation catalyst complex of this invention are alkylated anthracenes, fluorenes, phenanthrenes, and in particular, 9,10-dimethylanthracene.

It has been determined very recently that polynuclear hydrocarbons as a class are alkylation catalyst poisons, but the degree of poisoning depends on the particular type of pure compound. For example naphthalene, when added to a dealkylation feed, had a mild poisoning effect while acenaphthene had a much more severe poisoning effect. Other pure compounds varying from a mild to severe poisoning effect were anthracene, indane, phenanthrane and pyrene. Prior to the discovery that the fluorescence exhibited by polynuclear compounds is directly proportional to the activity of the catalyst, there had been no way to utilize this knowledge. This invention has now clearly shown that the activity of alkylation catalyst complex can be accurately measured and thereafter maintained by conventional techniques by measuring the fluorescence of polynuclear compounds in the alkylated product and directly relating this fluorescence phenomenon to the catalyst activity as measured by the conversion of benzene and ethylene, for instance, to ethylbenzene.

What is claimed is:

1. In a process for the preparation of monoalkylated aromatic compounds in the presence of a Friedel-Crafts organo-metal halide catalyst complex to produce both mono- and polyalkylated aromatic compounds and wherein said polyalkylated aromatic compounds are dealkylated in the presence of said catalyst complex, the steps which comprise measuring the amount of fluorescence of the alkylate to thereby determine the activity of the catalyst complex.

2. In a process for the preparation of alkylated aromatic compounds wherein an olefin is reacted with an aromatic compound in the presence of a Friedel-Crafts organo-metal halide catalyst complex and wherein said catalyst complex activity is maintained by the addition of fresh metal halide, the steps which comprise measuring a portion of said alkylated product for its fluorescence and regulating the addition of the metal halide to said catalyst complex with respect to a predetermined fluorescence setting by supplying a sufficient quantity of metal halide to said catalyst complex whenever said fluorescence measurement rises above the said predetermined setting to restore the activity of said catalyst complex to said predetermined value.

3. In a process for the preparation of monoalkylated aromatic compounds wherein polyalkylated aromatic compounds are dealkylated in the presence of a Friedel-Crafts organo-metal halide catalyst complex and wherein said catalyst complex activity is maintained by the addition of fresh metal halide, the steps which comprise measuring a portion of said dealkylated product for its fluorescence and regulating the addition of the metal halide to said catalyst complex with respect to a predetermined fluorescence setting by supplying a sufficient quantity of metal halide to said catalyst complex whenever said fluorescence measurement rises above the said predetermined setting to restore the activity of said catalyst complex to said predetermined value.

4. The process of claim 1 in which said olefin is ethylene and said aromatic compound is benzene, said organo-metal halide catalyst complex is a complex of aluminum chloride and said polyalkylated aromatic compounds are polyethylbenzenes.

5. The process of claim 1 wherein the reaction of an olefin and an aromatic compound in the presence of a Friedel-Crafts organo-metal halide catalyst complex is promoted with a hydrogen halide.

References Cited by the Examiner
UNITED STATES PATENTS

| | | | |
|---|---|---|---|
| 2,357,978 | 9/1944 | Schmerling et al. | 260—671 |
| 2,850,552 | 9/1958 | Ogle | 260—671 X |
| 2,932,677 | 4/1960 | Kirk et al. | 260—674 |

References Cited by the Applicant

Boundy-Boyer: Styrene—Its Polymers, Copolymers and Derivatives, Reinhold Publishing Co., 1952, pp. 31–33.

Brooks et al.: Ed., The Chemistry of Petroleum Hydrocarbons, vol. 3, Reinhold Publishing Co., 1955, pp. 580–585.

DELBERT E. GANTZ, *Primary Examiner.*

PAUL M. COUGHLAN, *Examiner.*

C. R. DAVIS, *Assistant Examiner.*